Patented Jan. 4, 1944

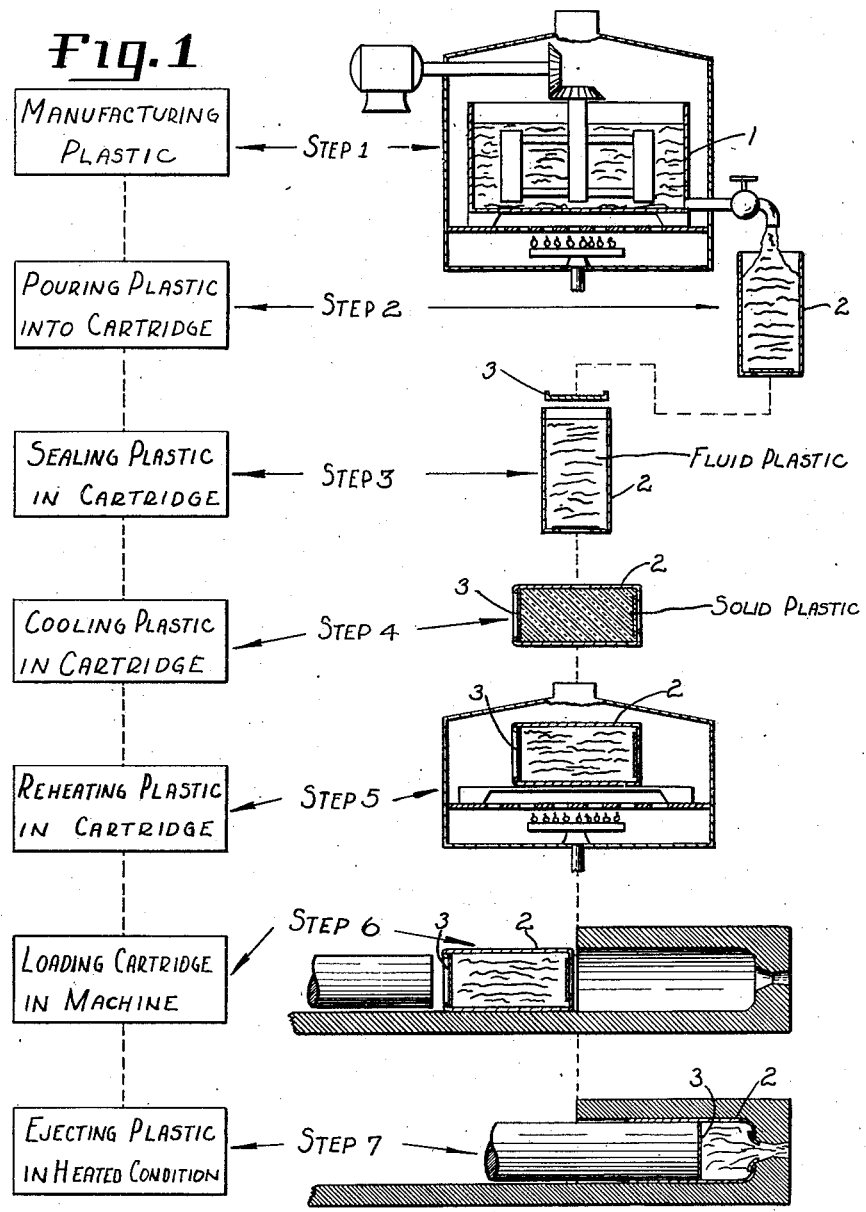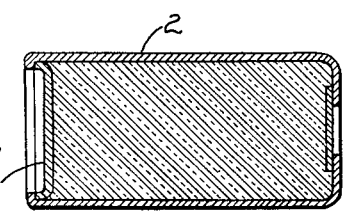

2,338,607

UNITED STATES PATENT OFFICE 2,338,607

METHOD OF PREPARING CARTRIDGES

George W. Wacker, Cincinnati, Ohio, assignor to The Grotelite Company, Bellevue, Ky., a corporation of Kentucky Application August 16, 1938, Serial No. 225,181

2 Claims. (Cl. 18—55)

My invention relates to a method of preparing plastic extrusion material for use in a cartridge injection machine.

It is the object of my invention to provide a method of preparing a cartridge so that the minimum size of cartridge may be employed, so that the use of plastic materials in loose powder or granular form may be eliminated and so that the accuracy of measurement of the injected material may be increased with a constant decrease of the plastic material waste.

It is a further object of my invention to provide a cartridge filled with a solid plastic material that can be preheated in the cartridge to a plastic condition so that it can be inserted in the plastic injection machine in its heated plastic condition and be forced from the cartridge.

It is a further object of my invention to provide such a cartridge that it may be preheated without injury to the material.

By this invention, I use the solid or semi-solid plastic material, that is contained within a cartridge and is sealed therein so that it can be heated in the cartridge to place it in a plastic condition therein so that it can be ejected as set forth in the application of George W. Wacker, Serial No. 195,591, filed March 12, 1938.

Referring to the drawing:

Figure 1 is a diagrammatic view of the several steps of the invention.

Figure 2 is a section through a cartridge having a load of solid plastic material with which it has been filled while the plastic is in its liquid or semi-liquid condition.

Referring to the drawing in detail, the first step in the process is to manufacture the plastic in the container 1 (or by any conventional means), and after the completion of its manufacture while it is still in its liquid or semi-liquid, or plastic, state, it is poured, as the second step, into the cartridge 2. Then it is immediately sealed, as step 3, by the cover 3 being applied to the cartridge 2. Any one of the types of cartridge shown in the above mentioned Wacker application may be employed.

Thereafter as step 4, it is cooled and ready for storage or shipment. When it is ready for use, the solid plastic within the sealed cartridge is heated. This is step 5.

The temperature can gradually be brought up until the plastic is again sufficiently plastic due to heat, but without oxidation, to be ejected from the cartridge when it is loaded in the injection machine. It is then loaded in the injection machine, step 6, and ejected by applying pressure to one end and forcing the material through a ruptured container or cartridge at the other end. This is step 7.

It is therefore seen that my method comprises the steps of making the plastic in liquid or semi-liquid condition, pouring it in such condition into a container, such as a cartridge, sealing it, cooling it, reheating it while sealed and thereafter immediately placing it in heated condition in the ejection machine.

I find that this is desirable with certain types of plastics in preference to filling the cartridge with granular plastics. A much smaller cartridge can be employed. A far more accurate quantity can be measured. The size of the cartridge can be reduced thereby reducing the size of the machine and the bulk of the cartridges in shipping. The heating problem without oxidation is successfully solved.

In handling certain materials, such as Styrene, Lucite and similar compounds of very friable nature or requiring very high pressure to force into the mold, much difficulty has been experienced due to some of the material being forced into the clearance space between the plunger and its cylinder wall, resulting in a "stuck" plunger.

An extremely close fit between the cylinder and plunger, with the practical elimination of running clearance, so that no space exists for the material to crowd in, results, in practice, in gauled cylinders due to mechanical friction, unless very hard and costly materials are employed. Some improvement might be obtained by allowing an excessive clearance between plunger and cylinder, resulting in a comparatively thick skin of leaking material. Difficulty in keeping the plunger central, with a uniform wall of leaking material separating it from the cylinder wall, precludes the use of this method in practice. The cartridge system overcomes these difficulties.

By the use of the cartridge system, the act of collapsing the cartridge upon its contents under very heavy pressure, has the additional very desirable effect of forcing the material of the cartridge into close contact with the sides of the cylinder. This contact is closer than possible with a running fit between piston and cylinder, and prevents the material from finding its way into this space and jamming. As the crushed cartridge is expelled at the end of the stroke, this operation consists virtually of fitting a very tight fitting seal between the end of the plunger and the actual material to be extruded, because not only is the clearance space sealed, but the material of the cartridge is interposed between the molding material and the end of the plunger. In this way, molding materials that give much trouble with ordinary self-heating molding machines are readily handled by the cartridge method.

With ordinary self-heating injection molding machines, a substantial portion of the working stroke of the injection plunger is used for feeding a fresh charge of material into the heating cylinder, and the effective stroke forcing the plasticized material into the mold at high pressure, does not commence until this feeding of new material has been accomplished.

By using the cartridge system, practically the entire stroke of the injection plunger is made effective, and is utilized for the injection of material into the mold. The only portions of the stroke not utilized for useful work are the slight clearance provided to assure proper entrance of the cartridge into the cylinder, and such part of the stroke as is necessary to eject the exhausted cartridge. Therefore, a machine using the cartridge method has a capacity from two to three times as great as the conventional type.

In connection with the above, it should also be observed that the conventional type of machine, using material in loose powder form, must lose some of the plunger travel in compressing this loose material to a point where the great pressure of the plunger may be transmitted through the new charge, to the plasticized charge awaiting transfer to the mold.

The conventional type of molding machine uses molding powder that has been ground to a certain size of particle. By the use of the cartridge method, the necessity of converting the manufactured stock into a powder of certain size is eliminated, and the stock may be inserted into suitable cartridges or containers during the process of manufacture. In this way a substantial saving in production cost is effected.

Another advantage lies in the fact that gates and sprues may be packed into the cartridges, together with enough other material to make the required weight, without the necessity of cutting them up or grinding them into a powder.

By filling cartridges with dense material during the process of manufacturing the molding compounds, instead of using the material in the powdered form, an increase of almost one hundred per cent in volume is obtained. The proportion of loose to compressed material is approximately 2.5 to 1, but allowance must be made for some space loss in filling and for the material of the cartridge.

The conventional type of molding machine, with its self contained heater, possesses an inherent fault in that the temperature of the heating element must obviously be higher than the plasticizing temperature of the material. This temperature differential depends upon many factors, but it will be readily seen that a temporary delay in the operation of the machine, resulting in subjecting the material in the heating chamber to this higher temperature for a period longer than normal, will also result in overheating of the charge, causing "bleeding" or oozing of the material from the open end of the chamber. To minimize the effects of this "bleeding," it is customary to provide the injection nozzle with a comparatively small orifice, thereby interposing some resistance to this bleeding, and reducing it to within practical limits. This small orifice, or restriction, necessarily limits the passage of the plasticized material into the mold, and slows up the injection process in proportion to the restriction.

By using the cartridge principle, there is no heating element to be kept at a temperature higher than that of the cartridge when it is placed in the machine. Therefore, there is no necessity for the restricted nozzle essential to the operation of the conventional machines, and the orifice can be of such size as will permit the injection of the material into the mold in the shortest possible time, or with a greatly reduced pressure.

In considering the above, it must be recalled that the cartridge may be of such size as to require its entire contents to fill the mold. Or it may contain enough plasticized material to permit filling the mold many times before becoming emptied. In either case, the large nozzle orifice may be used.

It will be understood that I desire to comprehend within my invention such modifications as may be necessary to adapt it to varying conditions and uses.

Having thus fully described my invention, what I claim as new and desire to secure by Letters Patent, is:

1. In a method of plastic injection the step (a) of selecting a casing filled with solid plastic molding material of substantially the same cross sectional dimensions as the injection chamber of the injection molding machine to be used; the step (b) of heating said casing with said solid molding material therein to bring the material in the casing to a plastic state while maintaining it substantially in its original shape; the step (c) of placing the heated casing and its contents in the injection chamber of the machine; and the step (d) of applying pressure to move the casing bottom longitudinally relatively to the side wall thereof while so heated to compress and expel the molding material and inject it into a mold.

2. In a method of plastic injection, selecting a casing filled with solid plastic molding material of substantially the same cross sectional dimensions as the injection chamber of the injection molding machine to be used, heating the plastic material while retained in said casing to bring the contents to a plastic state, inserting the heated casing and contents in the injection chamber of a plastic injection molding machine, and applying pressure to the casing bottom while holding a part of the casing side wall stationary to move the bottom of said casing relatively to the side wall and expel the contents and at the same time to move the side wall outward into sealing engagement of the inner wall of the injection chamber.

GEORGE W. WACKER.